Patented Nov. 10, 1925.

1,560,900

UNITED STATES PATENT OFFICE.

VIGGO DREWSEN, OF LARCHMONT, NEW YORK, ASSIGNOR TO WEST VIRGINIA PULP AND PAPER COMPANY, OF NEW YORK, N. Y., A CORPORATION OF DELAWARE.

PROCESS OF TREATING WASTE SODIUM MONOSULPHITE LIQUORS.

No Drawing. Application filed October 18, 1923, Serial No. 669,282. Renewed April 4, 1925.

*To all whom it may concern:*

Be it known that I, VIGGO DREWSEN, a citizen of the United States, and resident of Larchmont, county of Westchester, State of New York, have made certain new and useful Improvements Relating to Processes of Treating Waste Sodium Monosulphite Liquors, of which the following is a specification.

This application is a partial continuation of my copending case, Serial No. 549,195, filed April 3, 1922 and contains subject matter taken therefrom.

This invention relates particularly to processes of treating the waste sodium monosulphite cooking liquors which are produced in the digestion of straw, corn stalks, wood, and other fibrous material, for the production of paper pulp etc. so as to recover the valuable inorganic constituents of such liquors and prepare the cooking liquors for reuse in fiber digestion. The waste sodium monosulphite liquor from the digestor is preferably concentrated as in vacuum evaporators until it contains only about fifty per cent of water. Then ten to thirty per cent more or less of slaked lime or powdered quick lime, which act similarly in this process and are called lime, is added and incorporated with the hot concentrated liquor as in an agitator tank when additional soda to make up the soda losses may also be incorporated in the form of a strong solution of nitre cake or other form of sodium sulphate, for instance. The mixture may then be incinerated in a suitable furnace such as a continuous or intermittent type of rotary burner where the material is dried and incinerated and melted while the chemical reactions take place, which result in the formation of calcium sulphide and sodium carbonate, etc. This calcined and fused material, containing calcium sulphide and soluble sodium carbonate, may be leached to recover the carbonate while the remaining calcium sulphide, which may be ground at any desired stage of the process, may be suspended in water and treated with carbon-dioxide as by percolation with kiln gases or stronger carbon dioxide which form calcium carbonate and liberate hydrogen sulphide which may be burned to form sulphur dioxide for combination with the sodium carbonate to form the desired sodium monosulphite for the fibrous cooking liquor. The remaining calcium carbonate may be burned as in a rotary lime kiln to form quick lime for use in this process.

The concentrated waste liquor resulting from the sodium monosulphite process of cooking straws, corn stalks, wood, etc., may be incorporated or combined with ten to thirty per cent more or less of lime in the form of ground caustic lime or finely divided hydrated lime, which seems to combine with and fix the organically combined sulphur and prevent its undesirable elimination during the incineration treatment as would be likely to occur if calcium carbonate was used with the waste liquor. This lime, which should be present in amounts at least sufficient to combine with all the sulphur present may be added to the hot concentrated waste liquor from the evaporators which may contain about fifty per cent of water, nitre cake or other sodium salts being added in sufficient amounts to make up for the soda loss and a thorough incorporation secured as in agitator tanks. The mixture is then fed into a continuous or intermittent furnace or rotary burner where it is dehydrated and then incinerated and melted. This may be effectively done in a rotary burner such as is used for the recovery of soda from waste cooking liquors and in which the burner is arranged for intermittent operation so that a single charge is quickly fed into the heated burner and after treatment quickly discharged therefrom in molten condition as from a discharge opening in the burner wall.

When such a charge of concentrated waste liquor and incorporated nitre cake and chemical excess of lime is fed into such an intermittent rotary burner, heated by an internal flame or by a separate heating furnace communicating with its lower end, the charge dries quickly on the slowly moving furnace walls and forms granular carbonaceous material which is uniformly heated as the furnace revolves slowly so as to minimize dusting losses. As the carbonaceous material becomes hotter it is converted into a viscous condition in which the particles adhere together and begin to slide around within the rotary burner and the material finally melts into a thick sirupy mass within which highly heated molten material the final chemical reactions take place. Ample carbon is usually present in the material for the desired reducing action, and this carbon in reducing the other materials form carbon dioxide which at first at relatively low heats is absorbed as by combination with the soda and lime, while at higher heats toward the end of the reaction, it is reduced by the carbor to carbon monoxide which burns in jets or flames at the top of the molten material. It is desirable to discharge the molten material at about this point to prevent undesirable oxidation and losses of the valuable components, and the molten material may be discharged in any convenient way as by being poured out of the rotary furnace into metallic ladles, tanks, or cars for cooling and further treatment.

This fused soda material after being allowed to stand for several days and thoroughly cooled, may be broken up into convenient sized lumps or particles for leaching and other treatment. Where twelve or fifteen per cent of slaked lime was added to the concentrated fifty per cent waste monosulphite liquor from wood pulp manufacture as seems preferable in some cases, the fused material comprised some thirty per cent of calcium sulphide and ten per cent or so of calcium hydrate, free carbon usually being present to the extent of some ten to fifteen per cent under good incinerating conditions. Samples of this fused material also comprised about thirty-five to forty per cent of sodium carbonate in addition to a little sodium sulphide etc.

This fused soda material after being reduced to convenient size may be leached in any suitable way as in a series of percolating tanks in which may be leached out the sodium carbonate and the few per cent of resulting sodium hydrate which is produced by the calcium hydrate present, causticizing some of the sodium carbonate as soon as solution occurs. These sodium salts may then be converted into the desired sodium monosulphite by reaction in a percolating tower, for instance, with the sulphur dioxide which may be formed from the leacher residue. This leacher residue contains considerable calcium sulphide which may be converted by suspending it in water and percolating carbon dioxide through the agitated material under pressure so as to drive off hydrogen sulphide gas which may be burned into sulphur dioxide.

This invention has been described in connection with a number of illustrative materials, proportions, conditions, arrangements and orders of steps, to the details of which disclosure the invention is not of course to be limited, since what is claimed as new and what is desired to be secured by Letters Patent is set forth in the appended claims.

I claim:

1. The process of treating the waste sodium monosulphite cooking liquor produced in the digestion of vegetable fibrous material, which comprises concentrating the waste liquor until it contains only about fifty per cent of water, thoroughly incorporating therewith nitre cake and between about ten to thirty per cent of hydrated lime to combine with and fix the organically combined sulphur and minimize its elimination, incinerating and melting the mixture to form sodium carbonate and calcium sulphide, leaching the sodium salts out of the melted material, treating the leached residue to form sulphur dioxide and combining the same with the sodium salts to form sodium monosulphite for the cooking liquor.

2. The process of treating the waste sodium monosulphite cooking liquor produced in the digestion of vegetable fibrous material, which comprises concentrating the waste liquor until it contains only about fifty per cent of water, thoroughly incorporating therewith sodium salts and between about ten to thirty per cent of hydrated lime to combine with the organically combined sulphur and minimize its elimination, incinerating and melting the mixture to form sodium carbonate and calcium sulphide, and leaching the sodium salts out of the melted material.

3. The process of treating the waste sodium monosulphite cooking liquor produced in the digestion of vegetable fibrous material, which comprises concentrating the waste liquor until it contains only about equal proportions of water, thoroughly incorporating therewith between about ten to thirty per cent of finely divided lime adapted to combine with the organically combined sulphur and minimize its elimination, incinerating and melting the mixture to form sodium carbonate and calcium sulphide, and leaching the sodium salts out of the melted material, and treating the leached residue to recover sulphur compounds therefrom.

4. The process of treating the waste sodium monosulphite treating liquor produced in the digestion of vegetable fibrous material, which comprises concentrating the waste liquor, thoroughly incorporating therewith between about ten to thirty per cent of finely divided lime, incinerating and melting the mixture to form sodium carbonate and calcium sulphide, and leaching the sodium salts out of the melted material.

5. The process of treating the waste sodium monosulphite cooking liquor produced in the digestion of vegetable fibrous material, which comprises concentrating the waste liquor until it contains only about equal proportions of water, thoroughly incorporating therewith additional sodium salt and between about ten to twenty per cent of hydrated lime which is present in excess and which is adapted to combine with and fix the organically combined sulphur and minimize its elimination, heating and incinerating and melting the mixture while agitating the same to form sodium carbonate and calcium sulphide, leaching the sodium salts out of the incinerated material, treating the leached residue to form sulphur dioxide and combining the same with the sodium salts to form sodium monosulphite for the cooking liquor.

6. The process of treating the waste sodium monosulphite treating liquor produced in the digestion of vegetable fibrous material, which comprises concentrating the waste liquor, thoroughly incorporating therewith between about ten to twenty per cent of lime which is present in excess and which is adapted to combine with and fix the organically combined sulphur and minimize its elimination, heating and incinerating and melting the mixture while agitating the same to form sodium carbonate and calcium sulphide, and leaching the sodium salts out of the incinerated material.

7. The process of treating the waste sodium monosulphite treating liquor produced in the digestion of vegetable fibrous material, which comprises concentrating the waste liquor until it contains only about equal proportions of water, thoroughly incorporating therewith at least about twelve per cent of finely divided lime which is adapted when heated therewith to combine with the organically combined sulphur and minimize its elimination, incinerating and melting the mixture while agitating the same to form sodium carbonate and calcium sulphide, and leaching the sodium salts out of the incinerated material, and treating the leached residue to recover sulphur compounds therefrom.

8. The process of treating the waste sodium monosulphite cooking liquor produced in the digestion of vegetable fibrous material, which comprises concentrating the waste liquor until it contains only about equal proportions of water, thoroughly incorporating therewith at least about twelve per cent of finely divided lime, incinerating and melting the mixture to form sodium carbonate and calcium sulphide, and leaching the sodium salts out of the incinerated material.

9. The process of treating the waste sodium monosulphite cooking liquor produced in the digestion of vegetable fibrous material, which comprises concentrating the waste liquor, incorporating therewith finely divided lime to the extent of about twenty-five to thirty per cent of the weight of concentrated waste liquor after deducting the contained water to combine with the organically combined sulphur and minimize its elimination, incinerating and melting the mixture while agitating the same to form sodium carbonate and calcium sulphide, and leaching the sodium salts out of the incinerated material, and treating the leached residue to recover sulphur compounds therefrom.

10. The process of treating the waste sodium monosulphite cooking liquor produced in the digestion of vegetable fibrous material, which comprises concentrating the waste liquor, incorporating therewith finely divided lime to the extent of more than twenty-five per cent of the weight of concentrated waste liquor after deducting the contained water, incinerating and melting the mixture to form sodium carbonate and calcium sulphide, and leaching the sodium salts out of the incinerated material.

VIGGO DREWSEN.